United States Patent
Walk (10) Patent No.: US 11,398,721 B2
(45) Date of Patent: Jul. 26, 2022

(54) RESILIENT APERTURE COVER FOR ELECTRICAL BOX

(71) Applicant: ALLIED MOULDED PRODUCTS, INC., Bryan, OH (US)

(72) Inventor: Zackery Walk, Antwerp, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 0 days.

(21) Appl. No.: 17/169,968

(22) Filed: Feb. 8, 2021

(65) Prior Publication Data

US 2021/0167588 A1 Jun. 3, 2021

Related U.S. Application Data

(63) Continuation-in-part of application No. 16/729,975, filed on Dec. 30, 2019, now Pat. No. 11,075,509.

(60) Provisional application No. 62/788,178, filed on Jan. 4, 2019.

(51) Int. Cl.
*H02G 3/08* (2006.01)
*B29C 45/16* (2006.01)
*B29L 31/34* (2006.01)
*H02G 3/12* (2006.01)

(52) U.S. Cl.
CPC ......... *H02G 3/085* (2013.01); *B29C 45/1676* (2013.01); *B29L 2031/3481* (2013.01); *H02G 3/126* (2013.01)

(58) Field of Classification Search
CPC ............... H02G 3/085; B29C 45/1676; B29L 2031/3481; H01G 3/126

USPC .......................................................... 174/500
See application file for complete search history.

(56) References Cited

U.S. PATENT DOCUMENTS

| | | | |
|---|---|---|---|
| 4,296,870 A | 10/1981 | Balkwill et al. | |
| 4,304,957 A * | 12/1981 | Slater ..................... | H02G 3/085 220/3.6 |
| 4,366,343 A * | 12/1982 | Slater ..................... | H02G 3/123 174/661 |
| 4,424,406 A * | 1/1984 | Slater ..................... | H02G 3/123 174/666 |
| 4,673,097 A | 6/1987 | Schuldt | |
| 4,724,281 A * | 2/1988 | Nix ......................... | H02G 3/123 174/53 |
| 5,004,115 A * | 4/1991 | L'Heureux ............. | H02G 3/123 220/3.3 |
| 6,239,365 B1 * | 5/2001 | McEvers ................ | H02G 3/123 29/854 |
| 6,908,003 B2 | 6/2005 | Feyes et al. | |
| 7,674,974 B1 | 3/2010 | Shotey et al. | |
| 9,018,524 B2 | 4/2015 | Dinh | |

(Continued)

*Primary Examiner* — Timothy J Thompson
*Assistant Examiner* — Michael F Mcallister
(74) *Attorney, Agent, or Firm* — Shumaker, Loop & Kendrick, LLP; James D. Miller (57) ABSTRACT

An electrical box assembly includes an electrical box structure including an interior defined by a plurality of walls with an aperture formed through one of the walls for providing access to the interior of the box structure. An aperture cover extends over the aperture. The aperture is formed from a resiliently flexible material and includes a slit forming feature for prescribing a location of a slit for selectively providing access to the interior of the electrical box structure. The resiliency of the aperture cover urges the aperture cover to a closed position of the slit to minimize air passage through the aperture cover.

18 Claims, 6 Drawing Sheets

(56) References Cited

U.S. PATENT DOCUMENTS

| | | |
|---|---|---|
| 9,893,503 B2 | 2/2018 | Geno |
| 2004/0182857 A1 | 9/2004 | Feyes et al. |
| 2009/0139742 A1 | 6/2009 | Bhosale |
| 2010/0051313 A1* | 3/2010 | Dinh .................... H02G 3/088 174/67 |
| 2010/0089640 A1* | 4/2010 | DiLillo ................ H02G 3/083 174/661 |
| 2013/0264088 A1 | 10/2013 | Dinh |
| 2017/0338635 A1 | 11/2017 | Stahl, II et al. |

* cited by examiner

RESILIENT APERTURE COVER FOR ELECTRICAL BOX

CROSS-REFERENCE TO RELATED APPLICATIONS

This patent application is a continuation-in-part application claiming priority to U.S. patent application Ser. No. 16/729,975 filed on Dec. 30, 2019, which in turn claims the benefit of U.S. Provisional Patent Application Ser. No. 62/788,178 filed on Jan. 4, 2019, wherein the listed patent applications are hereby incorporated herein by reference in their entireties.

FIELD

The present invention relates to electrical boxes such as currently used for mounting electrical devices in walls, floors, and ceilings, and more particularly, to a vapor seal feature for sealing apertures formed through the electrical box that are provided for receiving wires, cables, or cords for electrical connection to an electrical device disposed within the corresponding electrical box.

BACKGROUND OF THE INVENTION

Electrical boxes have long been required by the National Electrical Code to be used in building construction for enclosing electrical apparatus such as switches, sockets, and electrical appliance connections, for example. An electrical box is generally secured to a stud or a joist in a wall, a ceiling, or a floor construction with an open end or face, opening towards an interior of a building, room, or other structure.

Whenever the electrical box is utilized, a vapor barrier provided in a wall to prevent outside air from entering into a building is penetrated by the electrical box. Additionally, the switches, sockets, electrical appliance connections, or other electrical devices disposed within the interior of such electrical boxes must be accessed via one or more corresponding electrical wires, cords, or cables that are fed through one of the outer walls defining the interior of the electrical box to provide electrical communication with the corresponding electrical devices. This typically results in additional openings being formed through the electrical box in a manner allowing for the air disposed exterior to the electrical box to flow into the interior of the electrical box and then into the interior of the building, room, or other structure. The introduction of these additional air pathways can therefore allow for undesired air flow and heat transfer through the electrical box in a manner lowering the temperature control efficiency of the building, room, or structure having the electrical box.

Traditionally, such wires, cord, or cables are fed through what is referred to as a "knock out" formed in one of the walls of the electrical box. Such knock outs may be presented as portions of the wall that are grooved, notched, or scored to allow for the knock outs to be separated from the remainder of the wall to form an opening for the passage of the corresponding wire, cord, or cable. The knock outs are therefore formed from the same rigid material as the remainder of the wall of the electrical box, and the removal of each of the knock outs results in the introduction of a permanent opening providing the access to the interior of the electrical box. The formation of such knock out openings may require additional tools such as a screw driver, mallet, hammer, pliers, or the like, and therefore adds another step to the installation process regarding the electrical box and the associated electrical device disposed therein.

It is also common for such knock outs to be provided as having a larger cross-section than the wires, cords, or cables fed therethrough, hence it is possible for air to flow through the peripheral regions of such knock out openings. Additionally, it is not uncommon for the electrical box to be rewired in a manner requiring the removal of a previously inserted wire, cable, or cord, which results in the presence of a permanent air passageway through the electrical box if not subsequently addressed. In an attempt to prevent such undesired air flow, it is common for a foam sealant or the like to be used to cover the unused knock out opening or to seal around the peripheral region of a utilized knock out opening. The need to introduce such a sealant accordingly increases the complexity and number of materials and/or tools necessary for preventing undesired air passage through such knock out openings.

Thus, it is highly desirable to provide a new and improved electrical box that allows the electrical box to be installed in a wall construction while maintaining an integrity of the vapor barrier of the wall construction by eliminating or reducing any unnecessary air pathways through the electrical box that could communicate air between the opposing sides of the corresponding wall construction.

SUMMARY OF THE INVENTION

In concordance and agreement with the present invention, an electrical box assembly having a resiliently flexible aperture cover for minimizing undesired air flow through the electrical box assembly has surprisingly been discovered.

According to an embodiment of the invention, an electrical box assembly is disclosed comprising a box structure including an interior defined by a plurality of walls with an aperture formed through one of the walls for providing access to the interior of the box structure. An aperture cover extends over the aperture. The aperture cover is formed from a resiliently flexible material.

A method of manufacturing an electrical box assembly is also disclosed. The method comprises the steps of: molding a box structure in a first shot of a molding process, the box structure including an interior defined by a plurality of walls with an aperture formed through one of the walls for providing access to the interior of the box structure; and molding an aperture cover over the aperture of the box structure in a second shot of the molding process.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein.

DETAILED DESCRIPTION OF THE PREFERRED EMBODIMENT

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 1:
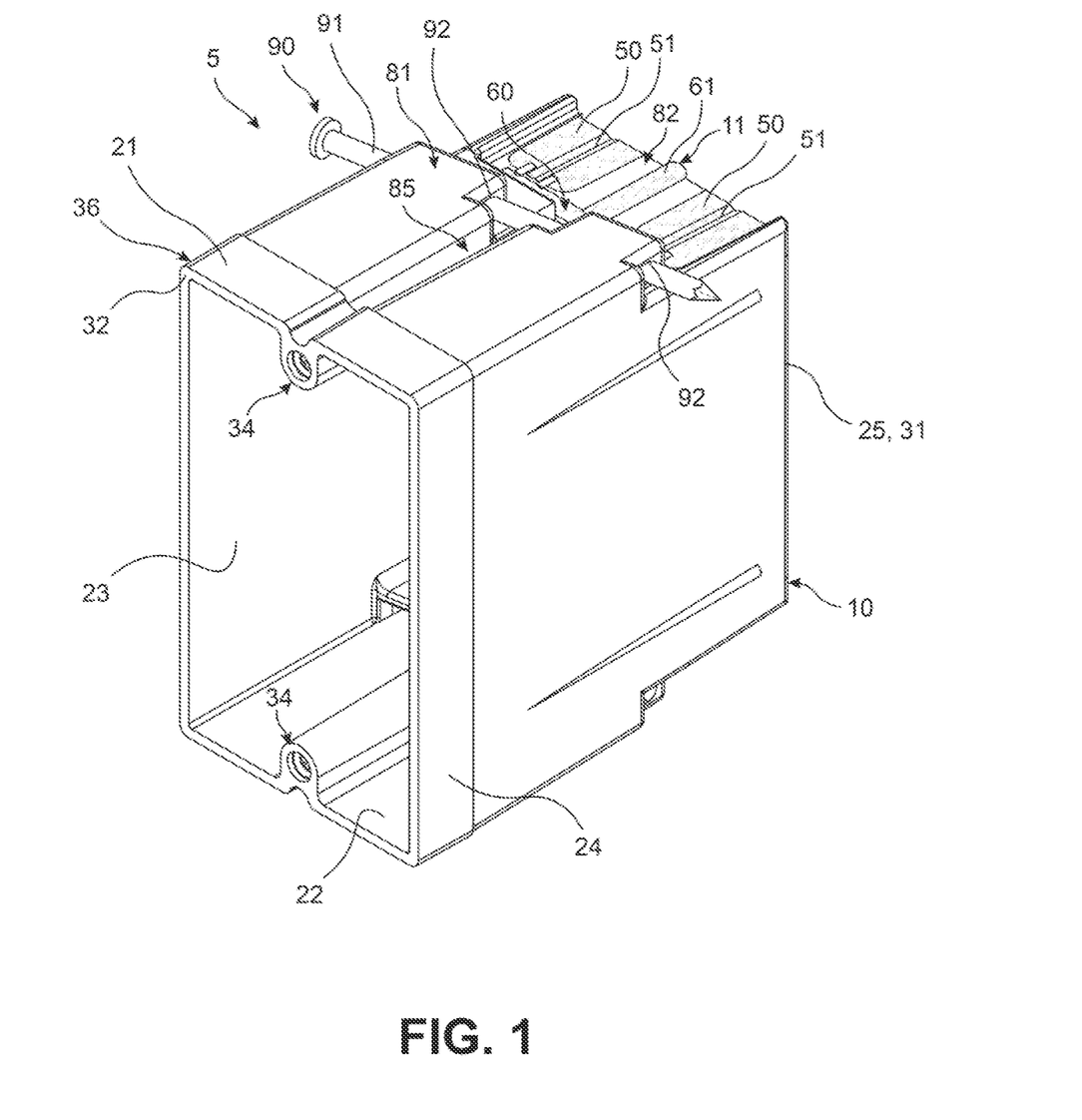
FIG. 1 is a perspective view of an electrical box assembly including an electrical box and a molding applied to the electrical box according to an embodiment of the present invention, wherein the molding includes at least one resiliently flexible aperture cover.
Figure 2:
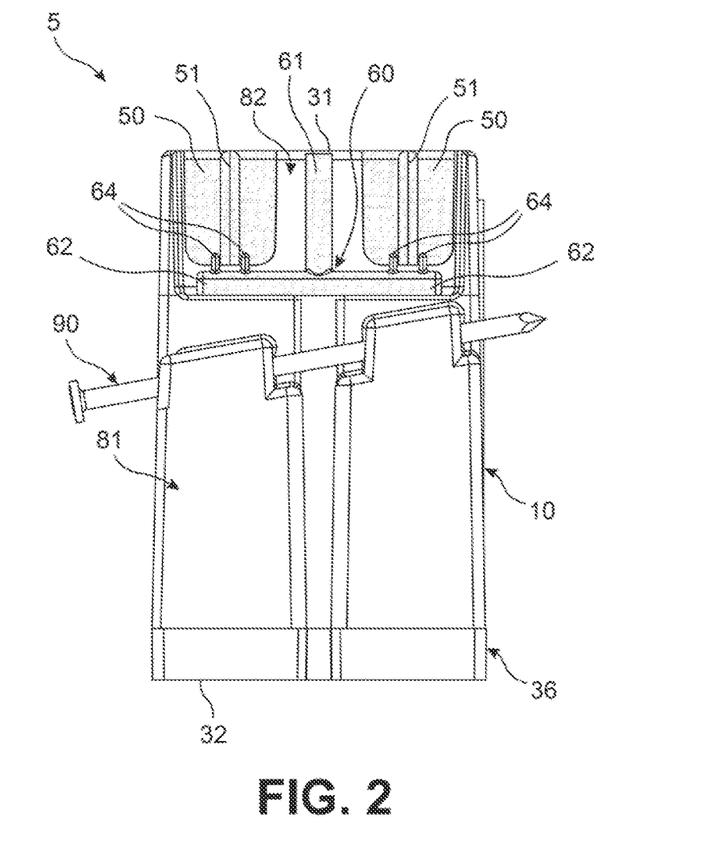
FIG. 2 is a top plan view of the electrical box assembly of FIG. 1.
Figure 4:
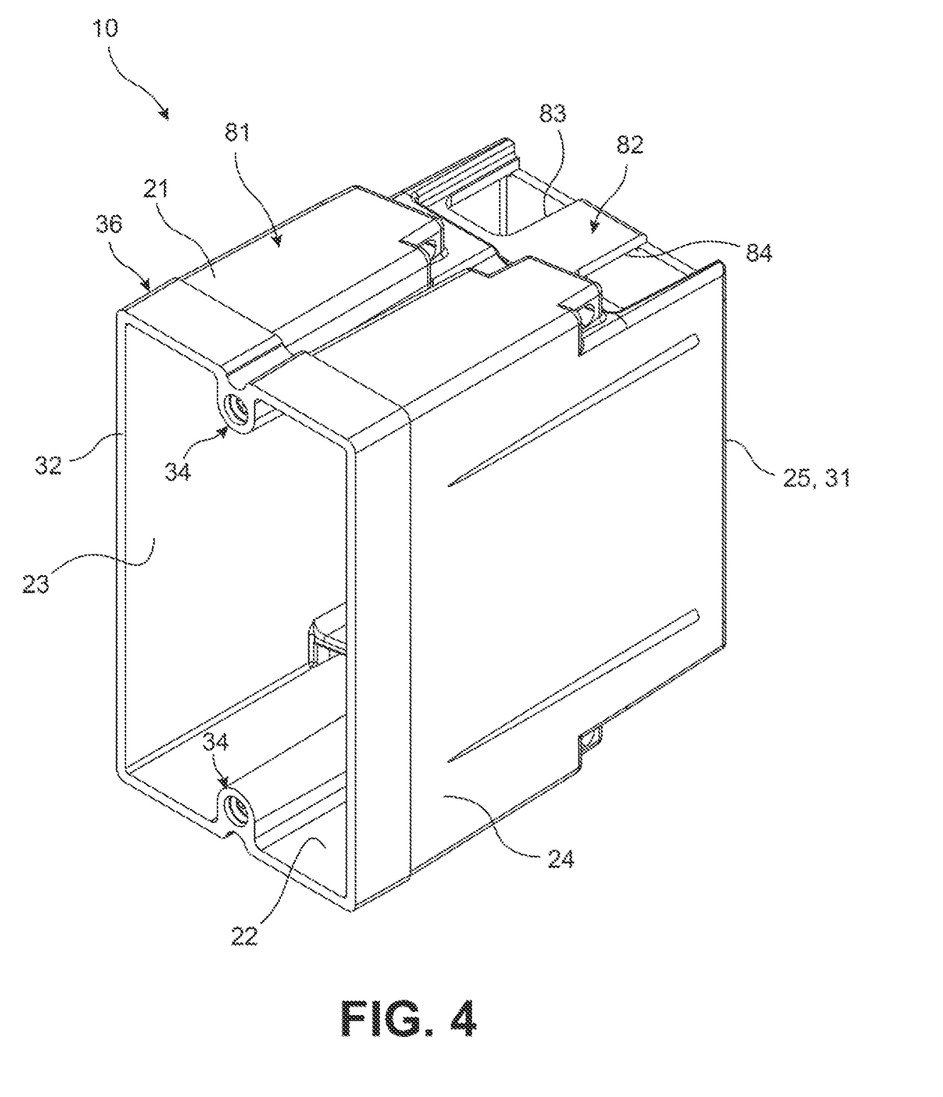
FIG. 4 is a perspective view showing the electrical box of the electrical box assembly prior to the formation of the molding.
Figure 5:
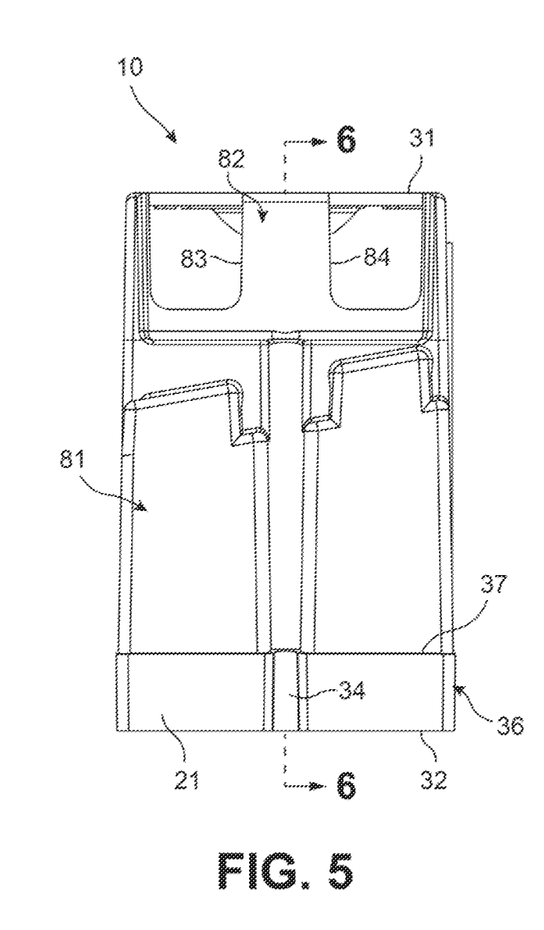
FIG. 5 is a top plan view of the electrical box of FIG. 4.
Figure 6:
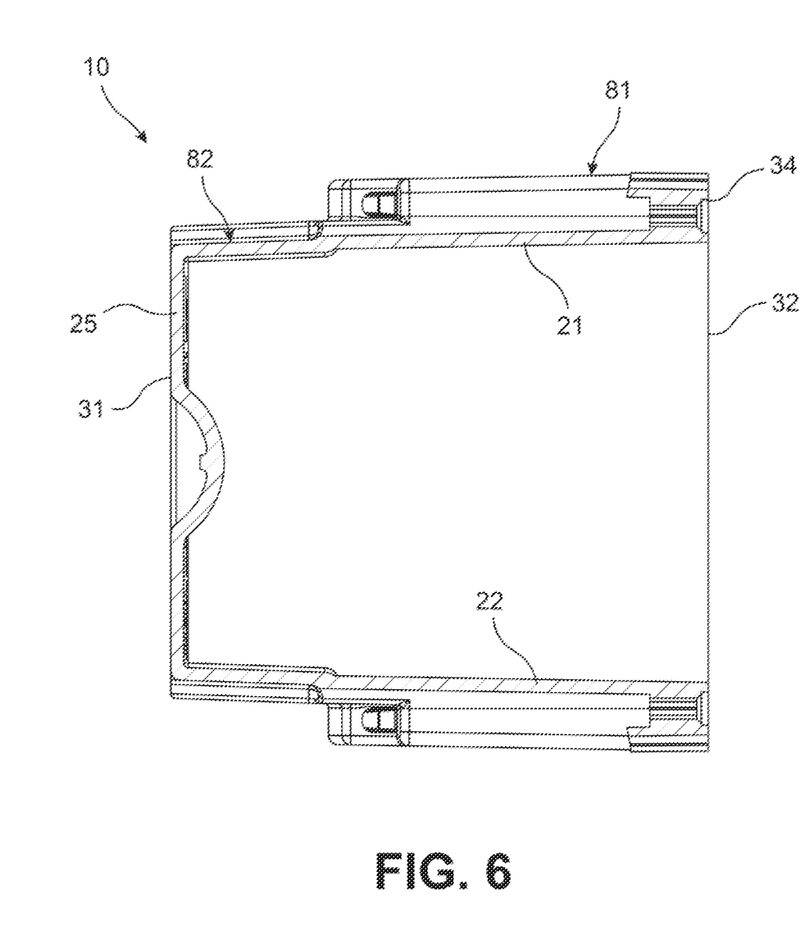
FIG. 6 is a cross-sectional elevational view of the electrical box taken from the perspective of section lines 6-6 of FIG. 5.
Figure 7:
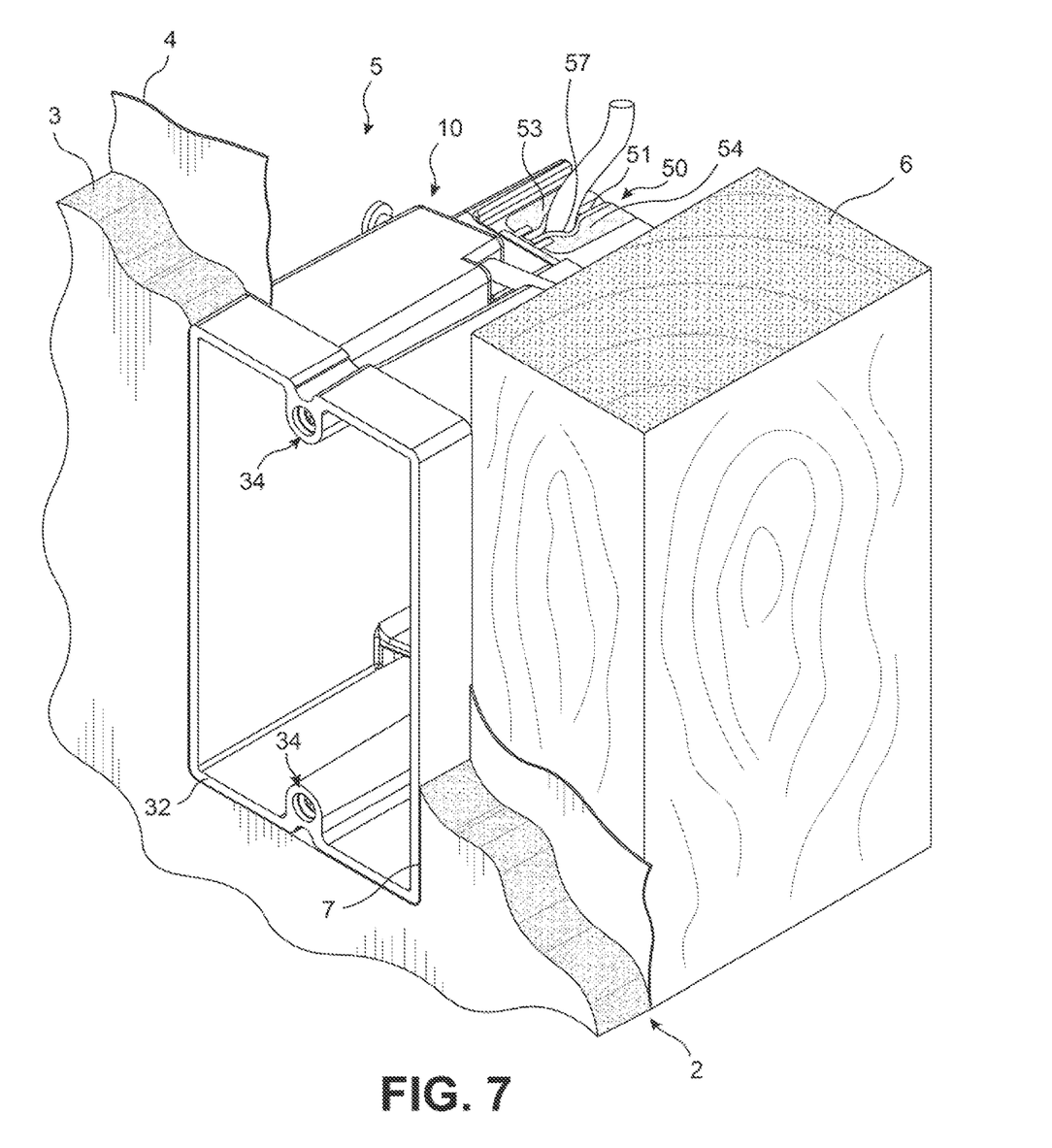
FIG. 7 is a fragmentary perspective view of a wall structure having the electrical box assembly of FIG. 1 installed therein with a wire, cord, or cable fed through one of the resiliently flexible aperture covers.

FIGS. 1, 2, and 7 illustrate an electrical box assembly 5 including an electrical box 10 having a molding 11 applied thereto according to an embodiment of the present invention. FIGS. 4-6 illustrate the electrical box 10 in isolation prior to the formation of the molding 11, and are accordingly referred to hereinafter when referencing the method of formation of the finalized electrical box assembly 5. As used herein, the term "electrical box" refers to any structure having a plurality of walls cooperating to define an interior thereof, and the term "electrical device" refers to any component capable of connection to a corresponding wire, cable, or cord for the transmission of electricity to the electrical device, wherein the electrical device is capable of being housed at least partially within the interior of the corresponding electrical box. The term "box" is accordingly not intended to limit the configuration of the interior of the electrical box to any one shape, such as the substantially rectangular cuboid shape shown and described hereinafter with reference to FIGS. 1, 2, and 4-9.

The electrical box assembly 5 is configured for reception within a wall structure, such as a vertically extending wall defining an interior surface of a room, a vertically extending wall forming an exterior surface of a building or similar structure, a horizontally extending ceiling structure, a horizontally extending floor structure, or the like. One skilled in the art should understand that the disclosed electrical box assembly 5 may be configured for reception in essentially any dividing structure arranged at any orientation while remaining within the scope of the present invention. For simplicity and brevity, the wall structure is described hereinafter with reference to an exemplary installation within a vertically extending wall structure forming an interior surface of a room.

For example, FIG. 7 illustrates one exemplary wall structure 2 for use with the electrical box assembly 5. The wall structure 2 includes a layer of drywall 3 facing towards an interior of the associated room formed by the wall structure 2, a vapor barrier 4 disposed adjacent and inwardly of the drywall 3 with respect to an interior direction the wall structure 2, and at least one vertically extending stud 6 disposed inwardly of the vapor barrier 4 with respect to the interior direction of the wall structure 2, wherein the stud 6 is configured to support the electrical box assembly 5 when in the installed position. The disclosed drywall 3 may be replaced with any rigid structure, panel, or substrate, as desired, and may include multiple layers of the rigid structures without departing from the scope of the present invention. The vapor barrier 4 is optional and may be formed from a thermally insulating, relatively thin, and substantially flexible material capable of preventing the passage of air of other fluids therethrough. The stud 6 forms a surface extending transversely from the drywall 3 configured for coupling to the electrical box assembly 5, as explained in greater detail hereinafter.

The drywall 3 and the vapor barrier 4 may be penetrated to form an opening 7 through the wall structure 2 having a perimeter shape corresponding to that of the electrical box 10 of the electrical box assembly 5. In the present embodiment, the resulting opening 7 is substantially rectangular in shape to correspond to the substantially rectangular perimeter shape of the electrical box 10, but one skilled in the art should appreciate that the electrical box 10 and the resulting opening 7 formed in the wall structure 2 may take on any corresponding closed perimeter shape without necessarily departing from the scope of the present invention, such as a circular shape, a square shape, a hexagonal shape, or the like, depending on the shape and configuration of the corresponding electrical box. The opening 7 may be positioned immediately adjacent the aforementioned coupling surface of the stud 6, as desired. One skilled in the art should readily appreciate that the electrical box assembly 5 may be configured for use with alternative building structure configurations or combinations while remaining within the scope of the present invention, as desired for the given application.

The electrical box 10 includes a plurality of sidewalls 21, 22, 23, 24 cooperating to form the rectangular perimeter shape thereof. More specifically, the sidewalls 21, 22, 23, 24 include a first sidewall 21 forming an upper portion of the electrical box 10 (when in the installed position of FIG. 7), a second sidewall 22 forming a lower portion of the electrical box 10 opposite the first sidewall 21, a third sidewall 23 connecting the first and second sidewalls 21, 22 at one lateral side of the electrical box 10, and a fourth sidewall 24 connecting the first and second sidewalls 21, 22 at the other lateral side of the electrical box 10 opposite the third sidewall 23. All of the sidewalls 21, 22, 23, 24 include a substantially equal depth as the sidewalls 21, 22, 23, 24 extend from a closed end 31 to an open end 32 of the electrical box 10. The closed end 31 of the electrical box 10 is formed by an end wall 25 of the electrical box 10 intersecting an inner end of each of the sidewalls 21, 22, 23, 24 while the open end 32 of the electrical box 10 is formed by the cooperation of the outer end of each of the sidewalls 21, 22, 23, 24. The third and fourth sidewalls 23, 24 are shown throughout as having a greater dimension in the vertical direction than do the first and second sidewalls 21, 22 in the horizontal direction, but any configuration of the sidewalls 21, 22, 23, 24 may be used without necessarily departing from the scope of the present invention, including an inversion of the major dimensions of the parallel arranged sets of the sidewalls 21, 22, 23, 24. The open end 32 of the electrical box 10 is configured to be positioned substantially co-planar with an outwardly facing surface of the drywall 3 while the closed end 31 of the electrical box 10 is disposed within an interior of the wall structure 2 when the electrical box assembly 5 is in the installed position as shown in FIG. 7.

The sidewalls 21, 22, 23, 24 of the electrical box 10 further form a collar 36 about the open end 32 of the electrical box 10. The illustrated electrical box 10 is a single gang rectangular box having opposing bosses 34 formed within the collar 36 at each of the first sidewall 21 and the second sidewall 22, wherein each of the bosses 34 is provided to extend into the electrical box 10 to provide connection for an electrical appliance mounted in the electrical box 10 or a cover received over the electrical box 10. However, other box configurations can be used such as a two gang box, a three gang box, a four gang box, and the like without departing from the scope of the present invention. If multiple gang boxes are utilized, the features of the electrical box assembly 5 as shown and described hereinafter may be repeated a suitable number of times to accommodate each additional electrical device associated with the electrical box assembly 5.

In the illustrated embodiment, the first sidewall 21 and the second sidewall 22 each include similar structure that is substantially mirrored about a horizontally extending plane, hence discussion is limited primarily to the form and configuration of the features found on the first sidewall 21. The first sidewall 21 includes a first portion 81 having substantially the same cross-section as the open end 32 of the electrical box 10 and a second portion 82 indented inwardly from the first portion 81 with respect to the vertical direction from the perspective of FIGS. 1 and 4, wherein the first portion 81 and the second portion 82 are disposed on substantially parallel arranged and horizontally extending planes. The second portion 82 includes a first aperture 83 and a second aperture 84 formed therein, wherein each of the apertures 83, 84 forms an opening providing access to an interior of the electrical box 10 from an exterior of the electrical box 10. The apertures 83, 84 are shown as being formed at an intersection of the first sidewall 21 with the end wall 25 and are spaced apart from each other with respect to a width direction of the electrical box 10 extending between the opposing third and fourth sidewalls 23, 24. However, the apertures 83, 84 may be spaced apart from the end wall 25 while remaining within the scope of the present invention, as desired.

The first portion 81 of the first sidewall 21 further includes a coupling feature 90 configured for coupling the electrical box assembly 5 to a structure such as one of the studs 6 as illustrated in FIG. 6. In the provided embodiment, the coupling feature 90 is formed by a fastener 91 extending laterally through openings 92 formed through the first portion 81 of the first sidewall 21. The fastener 91 may be a nail, a threaded screw or bolt, or the like, as desired. One skilled in the art should appreciate that any suitable type of coupling feature may be utilized for mounting the electrical box assembly 10 to the associated wall structure without departing from the scope of the present invention, including adhesives, tapes, clamping mechanisms, swing gates, or the like.

Although the electrical box 10 is shown and described as having the first portion 81 and the second portion 82 separated from each other with respect to the vertical direction of the electrical box assembly 5, it should be apparent that the electrical box 10 may instead be provided in the absence of such a stepped configuration while still maintaining the beneficial features of the molding 11 as described hereinafter. The stepped configuration of the electrical box 10 may be provided in order to better space and position features such as the bosses 34, the coupling feature 90, and the windows 83, 84 from one another for an ease of installation of the electrical box assembly 5 into the wall structure 2, as desired.

The electrical box 10 may be formed from a substantially rigid material capable of being formed into the shape and configuration disclosed in FIGS. 4-6. The rigid material may be any of a number of moldable thermoplastics including PVC, polycarbonate, polyphenylene oxide, or fiberglass reinforced polyester, as non-limiting examples. Other rigid materials may also be utilized for forming the electrical box 10 without departing from the scope of the present invention, as desired.

The molding 11 generally forms at least one aperture cover 50 for providing selective access to the interior of the electrical box 10, wherein each of the aperture covers 50 corresponds to a feature typically referred to as a "knock out" in more traditional electrical boxes, wherein each knock out is removed to provide access into the interior of the electrical box through a corresponding opening formed by the removal of the knock out. As explained in greater detail hereinafter, the molding 11 may be formed as part of a 2-shot molding process performed when manufacturing the electrical box assembly 5. In the provided embodiment, the molding 11 includes a first pair of the aperture covers 50 disposed in the first sidewall 21 and a second pair of the aperture covers 50 disposed in the second sidewall 22 with each of the aperture covers 50 corresponding to one of the apertures 83, 84 formed through the electrical box 10. It should be apparent to one skilled in the art that alternative combinations of the disclosed features may be formed within the electrical box 10 at additional or contrary positions without departing from the scope of the present invention, so long as the resulting structure is suitable for formation in the disclosed 2-shot molding process while maintaining the beneficial aspects of each of the features described hereinafter. For example, the aperture covers 50 may be formed in the sidewalls 23, 24 or the end wall 25 depending on the configuration and orientation of the electrical box assembly 5 when installed into the corresponding wall structure 2.

The molding 11, including each of the corresponding aperture covers 50, is formed to be resiliently flexible. The term "resiliently flexible" as used herein means when a portion of the molding 11 is bent and released, the molding 11 will return to an original position of the molding 11 (such as that shown in FIG. 1), when the molding 11 is exposed to room temperature. The molding 11 may accordingly be formed from a suitable resiliently flexible polymeric material, such as an elastomeric material, as desired. The polymeric materials used to form the molding 11 may include polyesters, polyurethanes, polyethers, polyamides, polyimides, polycarbonates, polyvinylchloride, and combinations thereof, so long as the resulting material has the resiliently flexible characteristics as described in greater detail hereinafter.

The first pair of the aperture covers 50 includes one of the aperture covers 50 disposed over the first aperture 83 of the second portion 82 of the first sidewall 21 and another one of the aperture covers 50 disposed over the second aperture 84 of the second portion 82 of the first sidewall 21. Each of the aperture covers 50 may be provided as a substantially planar membrane or sheet-like structure extending across an entirety of the corresponding aperture 83, 84 to overlay or cover the corresponding aperture 83, 84 with the molding material coupled to the inner surface defining the corresponding aperture 83, 84 about an entirety of the perimeter thereof, coupled to an outer surface of the second portion 82 of the electrical box 10 around the perimeter of the corresponding aperture 83, 84, or combinations thereof for surrounding the corresponding aperture 83, 84 in a fluid tight manner. In either circumstance, each of the aperture covers 50 is molded onto and adheres to the exposed surfaces of the electrical box 10 while extending across the flow cross-section of one of the apertures 83, 84 in a fluid tight manner in order to prevent the undesired passage of air through the corresponding one of the apertures 83, 84.

In the illustrated embodiment, each of the apertures 83, 84 includes a substantially rectangular or square perimeter shape, but it should be apparent that each of the apertures 83, 84 may include any perimeter shape and size suitable for entry of a corresponding wire, cord, or cable therethrough while remaining within the scope of the present invention. For example, the apertures 83, 84 may alternatively include a substantially semicircular shape with a rectilinear portion of the semicircular shape coinciding with the end wall 25 of the electrical box 10, or may be provided as circular openings spaced apart from the end wall 25, as non-limiting examples. The shape and configuration of each of the apertures 83, 84 may preferably be selected to ensure that the molding process used in forming the aperture covers 50 allows for the molding material to easily and reliably extend across each of the apertures 83, 84 in the manner described herein, including the disposition of each of the apertures 83, 84 and the corresponding aperture covers 50 at or immediately adjacent an outermost edge or surface of the electrical box 10, such as the edge formed between the first sidewall 21 and the end wall 25.

Each of the apertures 83, 84 and corresponding aperture covers 50 may have any suitable length and width for facilitating the entry of the desired wire, cord, or cable therethrough. For example, each of the apertures 83, 84 and/or aperture covers 50 may include dimensions on the order of ½ inch to 1 inch in any given direction, as one non-limiting example. Each of the aperture covers 50 may also include any suitable thickness for having the desired degree of flexibility/resiliency while also having a robustness preventing accidental or undesired penetration of one of the aperture covers 50 during installation, handling, or maintenance of the electrical box assembly 5. The thickness of each of the aperture covers 50 may be substantially similar to the thickness of the corresponding one of the sidewalls of the electrical box 10 through which the corresponding aperture 83, 84 is formed, wherein such a thickness may be within the range of about $1/16$ inch to ¼ inch, as one non-limiting example.

In the illustrated embodiment, each of the aperture covers 50 includes an indentation 51 formed therein. Each of the indentations 51 is shown as extending longitudinally in a depth direction of the electrical box 10 between opposing sides of the corresponding aperture cover 50. However, each of the indentations 51 may extend only partially across the corresponding aperture cover 50 or may extend across the corresponding aperture cover 50 in any desired direction, such as a lateral direction of the electrical box 10, without departing from the scope of the present invention.

Figure 3:
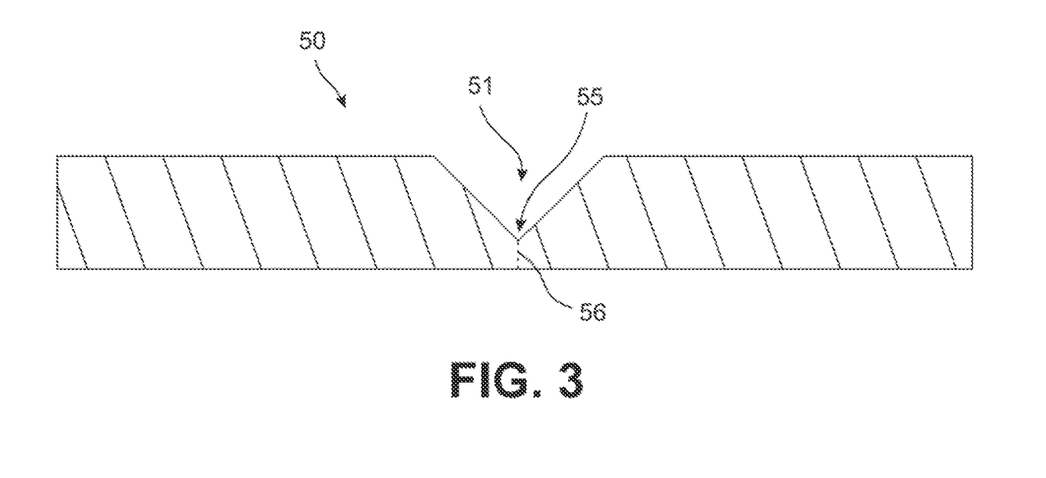
FIG. 3 is an enlarged elevational cross-sectional view taken through one of the resiliently flexible aperture covers of the electrical box assembly.

As best shown in FIG. 3, which shows a cross-sectional view through an isolated one of the aperture covers 50, each of the indentations 51 may have a substantially V-shaped cross-sectional shape with an internal corner 55 of the V-shape corresponding to a thinnest portion 56 of each of the aperture covers 50 with respect to the thickness direction of each of the aperture covers 50. The thinnest portion 56 may alternatively be referred to as a separation region 56 of each of the aperture covers 50 due to the tendency of each of the aperture covers 50 to separate along the corresponding internal corner 55 through the separation region 56 when a force is applied to the corresponding one of the aperture covers 50 in a direction perpendicular to the plane generally defined by the corresponding one of the aperture covers 50. Alternatively, the internal corner 55 may form a guide along which a corresponding cut may be made through the corresponding aperture cover 50 along the separation region 56, such as by a utility knife or the like. Each of the aperture covers 50 is configured to separate along the corresponding separation region 56 thereof to form a slit 57 therethrough for dividing the corresponding aperture cover 50 into a first flap 53 to one side of the slit 57 and a second flap 54 to an opposing second side of the slit 57, as shown with reference to FIG. 7.

The separation region 56 of the illustrated aperture cover 50 is shown as being about ¼ as thick as the remainder of the aperture cover 50 in FIG. 3, but the separation region 56 may have any ratio of thickness relative to the remainder of the corresponding aperture cover 50 while remaining within the scope of the present invention, such as being ⅕ as thick, ⅓ as thick, or ½ as thick, so long as the corresponding aperture cover 50 is weakened along the separation region 56 in a manner prescribing the desired separation of the corresponding aperture cover 50 to form the slit 57 and the opposing flaps 53, 54 during the introduction of the slit 57. It should also be apparent that each of the indentations 51 may include an alternative cross-sectional shape suitable for prescribing the separation of the corresponding aperture cover 50 or for guiding a corresponding cutting tool other than the illustrated V-shape, including a semi-elliptical or rectangular cross-sectional shape, while still remaining within the scope of the present invention.

During the installation of a corresponding electrical device within the electrical box 10, each of the slits 57 formed through one of the aperture covers 50 is configured to receive an electrical wire, cord, or cable therethrough to permit the wire, cord, or cable to pass into the interior of the electrical box 10. A resiliency of the material forming each of the separated aperture covers 50 also causes the opposing flaps 53, 54 to attempt to draw towards each other at the corresponding slit 57 following insertion of the wire, cord, or cable, thereby reducing a cross-section of a flow path formed between the surfaces of each of the flaps 53, 54 defining one of the slits 57 and the outer surface of the corresponding wire, cord, or cable. The resiliency of each of the aperture covers 50 further leads to the flaps 53, 54 returning to the closed position of the corresponding slit 57 following the removal of the wire, cord, or cable, such as when the wiring to the electrical device associated with the electrical box is reconfigured or removed. The resilient closing of each of the slits 57 accordingly facilitates the maintenance of optimum air tight conditions with respect to the electrical box assembly 5 both during and following the passing of a wire, cord, or cable into the interior of the electrical box 10 for connection to the associated electrical device.

In other embodiments, the indentation 51 formed in each of the aperture covers 50 may be replaced with an alternative slit forming feature for prescribing the formation of the corresponding slit 57 therein in similar fashion to that shown and described herein. For example, with reference to FIG. 10, each of the indentations 51 may be replaced with a series of perforations 58 partially or fully penetrating the thickness of the corresponding aperture cover 50 in a manner causing the formation of the slit 57 and the flaps 53, 54 in response to the application of the force perpendicular to the plane of the corresponding aperture cover 50. Even if the perforations 58 extend through the entirety of the thickness of the corresponding aperture cover 50, the resiliency of the material forming the corresponding aperture cover 50 naturally causes such small openings to normally remain in a substantially closed position. The perforations 58 may also be formed linearly along the internal corner 55 of one of the indentations 51 to further aid in prescribing the separation of the aperture cover 50 into the first and second flaps 53, 54 along the corresponding slit 57, as desired.

Each of the aperture covers 50 may also be provided with the corresponding slit 57 and opposing flaps 53, 54 preformed therein. The resiliency of each of the aperture covers 50 ensures that the flaps 53, 54 are normally drawn to each other with each of the slits 57 placed in the closed position, hence such preformed slits 57 still prevent the passage of air through each of the aperture covers 50 even if a wire, cord, or cable is not eventually fed therethrough. Such preformed slits 57 may be formed at one of the internal corners 55 of a corresponding indentation 51 in the absence of one of the separation regions 56, wherein the corresponding indentation 51 primarily acts as a piloting feature for guiding the wire, cord, or cable through the slit 57 when pressed against the aperture cover 50 in the vicinity of the slit 57. Alternatively, a cut may be premade through what is shown as the separation region 56 along the length of the indentation 51.

The electrical box assembly 5 may be manufactured by employing a 2-shot molding process. The first shot of the molding process includes the formation of the substantially rigid electrical box 10 (when at room temperature) while the second shot of the molding process includes the formation of the resiliently flexible molding 11 on an outer surface of the recently molded electrical box 10. A first mold (not shown) is provided having the form and configuration suitable for forming the electrical box 10 as shown in FIGS. 4-6, wherein the first mold is filled in conventional fashion with one of the materials described as being suitable for forming the electrical box 10 hereinabove. A first mold element of the first mold may define the interior of the electrical box 10 (as defined by the inner surface of each of the sidewalls 21, 22, 23, 24 and the end wall 25) while a second mold element of the first mold may close around the first mold element with the void present between the first and second mold elements defining the resultant electrical box 10.

Once the electrical box 10 is suitably formed and solidified using the conventional process, the electrical box 10 is repositioned relative to a second mold (not shown) for exposing an outer surface of the electrical box 10 to the molding material used to form the molding 11 onto the electrical box 10. The segments forming the second mold close around the exterior of the electrical box 10 while forming voids around the outer surface of the electrical box 10 corresponding in shape and configuration to the different portions of the molding 11 as shown and described herein. Additionally, the portion of the electrical box 10 corresponding to the interior thereof may still include the first mold element of the first mold therein or another similarly configured mold element of the second mold for prescribing the desired thickness of each of the aperture covers 50 from the interior of the electrical box 10.

As best shown in FIGS. 1 and 2, the molding 11 may be configured to allow for the introduction of the molding material to at least two, if not all four, of the aperture covers 50 simultaneously from a single entry point of the molding material through a connecting portion 60 of the molding 11. The connecting portion 60 is shown as including a centrally disposed first portion 61 and a pair of second portions 62 branching laterally from an end of the first portion 61 in opposing directions along the second portion 82 of the first sidewall 21. Specifically, the first portion 61 extends from the end wall 25 to a position past the aperture covers 50 before dividing laterally to forms each of the second portions 62 in a T-shaped configuration. Each of the second portions 62 extends laterally outwardly to a position coinciding laterally with the indentation 51 formed in the corresponding one of the aperture covers 50. Each of the second portions 62 is connected to the corresponding one of the aperture covers 50 by a pair of links 64 straddling the corresponding indentation 51. The illustrated connecting portion 60 allows for the molding material to enter an entry point of the second mold disposed at or adjacent the end wall 25 of the electrical box 10. The molding material then flows, in order, through the portions of the second mold corresponding to the first portion 61, the second portions 62, and the links 64. The molding material fills in the portions of the second mold corresponding to the apertures 83, 84 to form the pair of the aperture covers 50.

The described molding process may include one of the illustrated connecting portions 60 with respect to each of the first sidewall 21 and the second sidewall 22, wherein the molding material is introduced at two different entry points for forming two of the aperture covers 50 at a time. However, it should be apparent that the molding material may also be configured to flow along the end wall 25 through another portion of the second mold towards each of a pair of the connecting portions 60 for simultaneously forming all four of the aperture covers 50 simultaneously, wherein the portion of the molding 11 remaining on the end wall 25 may subsequently be removed from the outer surface of the electrical box 10, as desired.

Figures 8, 10:
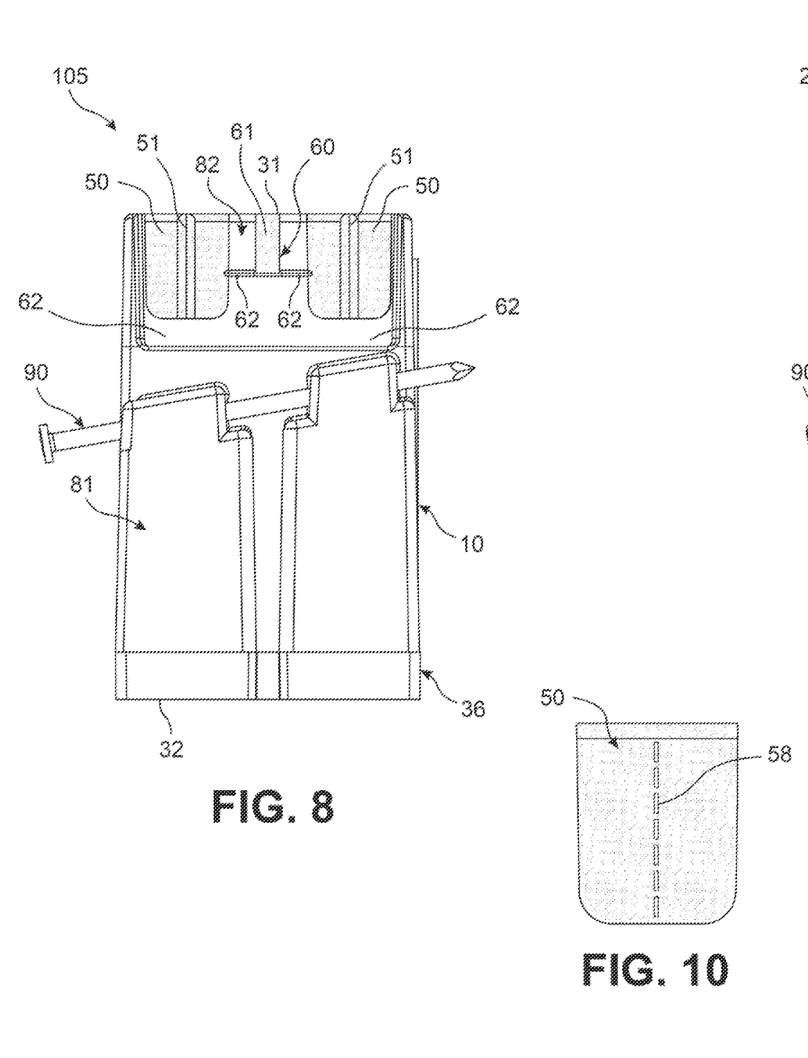
FIG. 8 is a top plan view showing an electrical box assembly according to another embodiment of the invention, wherein the electrical box assembling includes a molding configuration contrary to that of the electrical box assembly of FIGS. 1-7.
FIG. 10 is a top plan view of a resiliently flexible aperture cover according to another embodiment of the present invention, wherein the resiliently flexible aperture cover includes a plurality of perforations formed therein.
Figure 9:
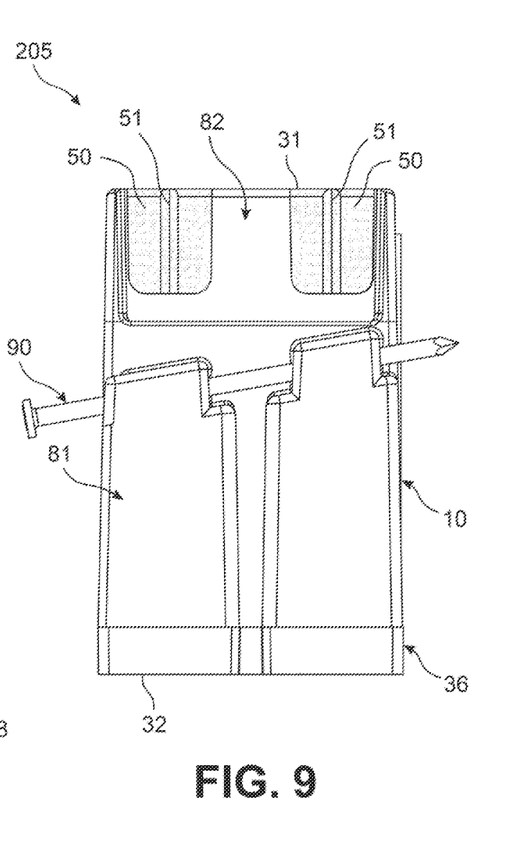
FIG. 9 is a top plan view showing an electrical box assembly according to yet another embodiment of the invention, wherein the electrical box assembling includes a molding configuration contrary to that of the electrical box assemblies of FIGS. 1-7 or FIG. 8.

FIGS. 8 and 9 illustrate two additional configurations of the molding 11 corresponding to two different configurations of the second mold used in forming the molding 11. FIG. 8 illustrates an electrical box assembly 105 wherein the connecting portion 60 includes the first portion 61 extending from the end wall 25 to a central position of each of the aperture covers 50 with respect to the depth direction of the electrical box 10, wherein the branching second portions 62 then connect directly to the spaced apart aperture covers 50 rather than wrapping around a distal side of each of the aperture covers 50 with the use of the additional links 64. FIG. 9 illustrates an electrical box assembly 205 devoid of any type of connecting portion present on the second portion 82 of the first sidewall 21, wherein the molding material is injected directly to the position of each of the apertures 83, 84 from a position adjacent the end wall 25 for forming each of the aperture covers 50. In either case, the molding material may also flow along the end wall 25 for flowing to as many of the apertures 83, 84 disposed within the first or second sidewalls 21, 22 as desired, wherein any portion of the molding 11 disposed on the end wall 25 may optionally be cut or otherwise removed from the electrical box 10, as desired. One skilled in the art should also appreciate that additional molding configurations to those shown and described may be utilized in forming the aperture covers 50, either individually or simultaneously.

Although the apertures 83, 84 and the corresponding aperture covers 50 are shown and described as being formed within the opposing sidewalls 21, 22 formed as upper and lower walls of the electrical box 10, it should be readily apparent that the apertures 83, 84 and the corresponding aperture covers 50 may be formed in any of the walls of the electrical box 10, including within the laterally disposed sidewalls 23, 24 or the end wall 25, as desired, so long as the resulting aperture covers 50 are formed to be resiliently flexible in a manner preventing the undesired passage of air therethrough while providing access to the interior of the electrical box 10.

Additionally, although the electrical box 10 is shown as having a rectangular peripheral shape, it should be understood by one skilled in the art that the general concepts of the present invention may be easily adapted to alternative peripheral shapes without departing from the scope of the present invention. For example, a cylindrical electrical box may include the apertures and corresponding aperture covers formed at desired locations within the outer circumferential surface of the electrical box, such as at diametrically opposed portions of the outer circumferential surface for forming the same general configuration of the connecting portions and aperture covers as is disclosed in the embodiments of FIGS. 1, 8, and 9.

In operation, the electrical box assembly 5 is secured to the corresponding wall structure 2. As shown in FIG. 7, the electrical box assembly 5 is secured to a stud 6 by means of the coupling feature 90. More specifically, the fastener 91 penetrates the stud 6 with one of the sidewalls 23, 24 placed in abutment with a surface of the stud 6 that is arranged perpendicular to the open end 32 of the electrical box 10. However, other suitable coupling means may be employed for coupling the electrical box assembly 5 to the stud 6 while remaining within the scope of the present invention.

An operator/installer of the electrical box assembly 5 can then insert a wire, cord, or cable through at least one of the aperture covers 50 to allow for an electrical connection to be made with any electrical devices housed within the electrical box 10. In some circumstances, the wire, cord, cable, or a tool used for guiding the wire, cord, or cable may be pressed against the indentation 51 of the selected one of the aperture covers 50 until the aperture cover 50 separates along the separation region 56 thereof due to the reduced thickness of the aperture cover 50 along the separation region 56. The separating of the aperture cover 50 results in the formation of the slit 57 and the separation of the opposing flaps 53, 54 to allow for passage or the wire, cord, or cable into the interior of the electrical box 10 for connection to the corresponding electrical device. Alternatively, the operator/installer may choose to cut or otherwise pierce the aperture cover 50 along the indentation 51 to form the slit 57, as desired. As mentioned above, in some embodiments the wire, cord, or cable may also be passed through a preformed slit 57 that is normally urged to a closed position for preventing the passage of air through the aperture cover 50.

The memory retention provided by the resiliency of the corresponding aperture cover 50 causes the opposing flaps 53, 54 to constrict around the outer surface of the inserted wire, cord, or cable, as shown with reference to FIG. 7. A minimized flow cross-section is then provided between the inner surfaces of the flaps 53, 54 defining the slit 57 and the outer surface of the wire, cord, or cable. Upon removal of the wire, cord, or cable, the flaps 53, 54 draw further towards each other and the slit 57 is effectively closed back to the position shown in FIG. 1.

In addition to optimizing the air flow through each of the aperture covers 50, the present invention also allows for an ease of entry into the interior of the corresponding electrical box 10. The relative flexibility of the material forming each of the aperture covers 50 allows for minimal force to be required to cause the separation of the flaps 53, 54 at the separation region 56, hence additional tools may be omitted from the installation process. The aperture covers 50 may be provided to be able to be penetrated by the finger of the operator/installer, for example.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly comprising:
a box structure including an interior defined by a plurality of walls, an aperture formed through one of the walls for providing access to the interior of the box structure;
an aperture cover extending over the aperture, wherein the aperture cover is formed from a resiliently flexible material, wherein the aperture cover includes a slit forming feature, the slit forming feature configured to aid in the formation of a slit through the aperture cover for providing access to the interior of the box structure through the aperture, wherein the slit forming feature is an indentation formed in the aperture cover, and wherein the indentation extends into an outer surface of the aperture cover opposite the interior of the box structure.

2. The electrical box assembly of claim 1, wherein the indentation coincides with a separation region of the aperture cover, the separation region having a thickness less than a remainder of the aperture cover.

3. The electrical box assembly of claim 2, wherein the separation region has a thickness less than or equal to half of a maximum thickness of the remainder of the aperture cover.

4. The electrical box assembly of claim 1, wherein the indentation includes a V-shaped cross-section.

5. The electrical box assembly of claim 1, wherein the slit defines a first flap and a second flap of the aperture cover, and wherein a resiliency of the aperture cover urges the first flap towards the second flap to a closed position of the slit when the first flap and the second flap are separated from each other.

6. The electrical box assembly of claim 1, wherein the slit forming feature is a plurality of perforations formed in the aperture cover.

7. The electrical box assembly of claim 1, wherein the aperture cover is overmolded onto the box structure over the aperture.

8. The electrical box assembly of claim 1, wherein the electrical box assembly is formed in a 2-shot molding process, a first shot of the molding process forming the box structure and a second shot of the molding process forming the aperture cover.

9. The electrical box assembly of claim 1, wherein the box structure includes a plurality of the apertures with each of the plurality of the apertures including one of the aperture covers extending thereover.

10. The electrical box assembly of claim 9, wherein the box structure includes two or more of the apertures formed in one of the walls of the box structure and/or at least one of the apertures formed in two or more of the walls.

11. The electrical box assembly of claim 1, wherein the box structure includes an end wall and at least one sidewall connecting the end wall to an open end of the box structure.

12. The electrical box assembly of claim 11, wherein the aperture is formed in one of the at least one sidewalls or the end wall.

13. The electrical box assembly of claim 1, wherein at least two of the aperture covers are connected to each other during a molding process used to form the aperture covers.

14. A method of manufacturing an electrical box assembly comprising the steps of:
   molding a box structure in a first shot of a molding process, the box structure including an interior defined by a plurality of walls, an aperture formed through one of the walls for providing access to the interior of the box structure;
   molding an aperture cover over the aperture of the box structure in a second shot of the molding process.

15. The method of claim 14, wherein the box structure is formed from a material that is rigid when at room temperature and the aperture cover informed from a material that is resiliently flexible when at room temperature.

16. The method of claim 14, wherein the aperture cover is overmolded onto the box structure about a periphery of the aperture.

17. The method of claim 14, wherein the box structure includes a plurality of the apertures with each of the aperture covers covered by one of the aperture covers, wherein at least two of the aperture covers are connected to each other during the second shot of the molding process.

18. An electrical box assembly comprising:
   a box structure including an interior defined by a plurality of walls, an aperture formed through one of the walls for providing access to the interior of the box structure;
   an aperture cover extending over the aperture, wherein the aperture cover is formed from a resiliently flexible material, wherein the aperture cover includes a slit forming feature, the slit forming feature configured to aid in the formation of a slit through the aperture cover for providing access to the interior of the box structure through the aperture, and wherein the slit forming feature is a plurality of perforations formed in the aperture cover.

* * * * *